United States Patent [19]

Hergenrother et al.

[11] 4,221,904
[45] Sep. 9, 1980

[54] POLYPHOSPHAZENE COPOLYMERS CONTAINING SUBSTITUENTS DERIVED FROM PYRUVATE ESTERS

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,114

[22] Filed: Sep. 8, 1978

[51] Int. Cl.² .................... C08G 79/04; C08G 79/00
[52] U.S. Cl. ................... 528/363; 528/168; 528/374; 528/399
[58] Field of Search .............. 528/399, 363, 168

[56] References Cited

U.S. PATENT DOCUMENTS

| | | | |
|---|---|---|---|
| 3,702,833 | 11/1972 | Rose et al. | 528/399 |
| 3,711,389 | 1/1973 | Hook et al. | 204/159.12 |
| 3,804,927 | 4/1974 | Lawson et al. | 260/977 |
| 3,844,983 | 10/1974 | Reynard et al. | 528/168 |
| 3,888,799 | 6/1975 | Rose et al. | 528/399 |
| 4,055,520 | 10/1977 | Dieck et al. | 528/168 |

Primary Examiner—Wilbert J. Briggs, Sr.

[57] ABSTRACT

Polyphosphazene copolymers are prepared which contain randomly distributed units represented by the formulas:

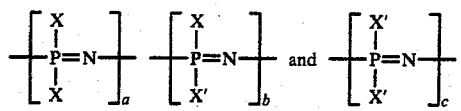

wherein X is

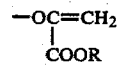

in which R is alkyl containing from 1 to 12 carbon atoms or aryl, wherein X' is selected from the group consisting of substituted or unsubstituted alkoxy, aryloxy, amino and mercapto groups and wherein $20 \leq (a+b+c) \leq 50,000$ per polymer.

The copolymers of the invention can be utilized to form solvent resistant films and may also be utilized in applications for moldings, coatings and the like. Additionally, the copolymers may be utilized as crosslinking agents for other reactive monomers or polymers. An especially useful feature of these copolymers is that they can be cured or crosslinked at room temperature.

12 Claims, No Drawings

POLYPHOSPHAZENE COPOLYMERS CONTAINING SUBSTITUENTS DERIVED FROM PYRUVATE ESTERS

BACKGROUND OF THE INVENTION

This invention relates to polyphosphazene copolymers containing repeating

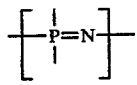

units in the polymer chain in which substituents derived from pyruvate esters and other compatible substituents are attached to the phosphorus atom. More particularly, the invention relates to copolymers containing substituents having the structure

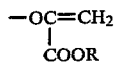

and other compatible substituents in which the substituents derived from pyruvate esters serve as curing or crosslinking sites for the copolymers.

Polyphosphazene copolymers containing small amounts of certain unsaturated substituents which are capable of undergoing further reaction (i.e. crosslinking) at temperatures ranging from 200° to 350° F. are described in U.S. Pat. Nos. 3,702,833; 3,844,983; 3,888,799 and 4,055,520. As described in the aforementioned patents, these reactive unsaturated substituents may be unsaturated monovalent radicals such as —OCH=CH$_2$; —ORCH=CH$_2$;

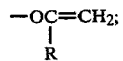

—ORCF=CF$_2$ and —OCH$_2$RF=CF$_2$ where R is an aliphatic or aromatic radical.

The copolymers described in the above patents exhibit a member of advantageous properties as a result of the inclusion of small amounts of the above described unsaturated substituents therein. Thus, the copolymers when crosslinked are useful as solvent and chemically resistant coatings, sealant, potting compounds and so forth. However, the copolymers of these prior art patents require elevated temperatures i.e., 200° to 350° F. to affect crosslinking.

In contrast, the copolymers of this invention contain as the cure site substituents derived from pyruvate esters which permits crosslinking or curing of the copolymers at room temperature. Alternatively, the copolymers may be cured at elevated temperatures, if desired.

SUMMARY OF THE INVENTION

In accordance with this invention, polyphosphazene copolymers are prepared which are curable at room temperature. These copolymers contain randomly distributed units represented by the formulas:

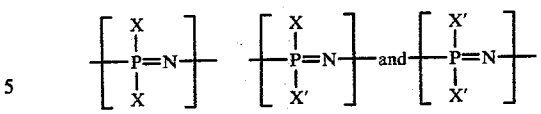

wherein X is represented by the formula

in which R is alkyl containing from 1 to 12 carbon atoms or aryl and X' is selected from the group consisting of substituted or unsubstituted alkoxy, aryloxy, amino or mercapto groups.

In the copolymer units represented by the above formulas, all X substituent groups may be the same or they may be mixed and all X' substituent groups may be the same or mixed. In the mixtures, the X substituent groups may be mixtures of substituent groups derived from different pyruvate esters and the X' substituent groups may be mixtures of alkoxy, aryloxy, amino and mercaptan groups or mixtures of different groups within each class (i.e. different alkoxy, aryloxy etc.).

The specific proportion of X to X' substituent groups incorporated in the copolymers of the invention may vary considerably depending upon the particular end use for which the copolymer is intended, chemical and physical properties desired, and the degree of crosslinking desired. In general, the copolymers may contain from about 0.1 to about 55 mole percent by weight of the X substituent and from about 45 to about 99.9 mole percent by weight of the X' substituent. For applications such as moldings, coatings, foams and the like, the copolymer should contain at least ten (10) mole percent of the X substituent.

The copolymers are prepared by reacting a poly(dichlorophosphazene) having the formula —(NPCl$_2$)$_n$— in which n is from 20 to 50,000 with a pyruvate ester and a substituted or unsubstituted aliphatic alcohol, aromatic alcohol, amino compound or mercaptan compound in the presence of a tertiary amine. Especially useful pyruvate esters are methyl pyruvate and ethyl pyruvate.

DETAILED DESCRIPTION OF THE INVENTION

I. The Poly(Dichlorophosphazene) Polymer

Poly(dichlorophosphazene) polymers which are employed as starting materials in preparing the polymers of this invention are well known in the art as illustrated in U.S. Pat. Nos. 3,370,020; 4,005,171; and 4,055,520, the disclosures of which are incorporated herein by reference.

These polymers have the general formula —(NPCl$_2$)$_n$— in which n may range from 20 to 50,000 or more. As described in the aforementioned references, the polymers are in general prepared by the thermal polymerization of cyclic oligomers having the formula —(NPCl$_2$)$_n$—, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about 10⁻¹ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. The Pyruvate Ester Substituent

Pyruvate esters (i.e. esters of pyruvic acid) which may be employed in forming the

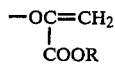

substituent are those represented by the formula CH₃COCOOR wherein R is an alkyl radical containing from 1 to 12 carbon atoms or aryl radical. Illustrative of pyruvate esters of the above formula which may be employed are methyl pyruvate, ethyl pyruvate, n-propyl pyruvate, n-butyl pyruvate, phenyl pyruvate, p-ethylphenyl pyruvate, and the like. The preferred pyruvate esters are those in which R is alkyl containing 1 to 12 carbon atoms and of these methyl and ethyl pyruvate are particularly preferred.

The specific reaction scheme by which these esters react with the polydichlorophosphazene polymer to incorporate the

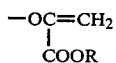

substituent thereon is not known with certitude. However, while not wishing to be bound by any particular theory, it is believed that in the presence of solvent and a basic or acidic catalyst the pyruvate ester either forms an equilibrium with its enol tautomer or forms enolate anions by removal of a proton from the carbon atom alpha to the carbonyl group. In either case, the enol or enolate form of the pyruvate ester would then be available for reaction with the polydichlorophosphazene polymer.

III. The Alkoxy, Aryloxy, Amino and Mercapto Substituents

As indicated heretofore, the polyphosphazene copolymers of this invention in addition to the

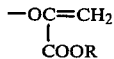

substituent group may contain substituted or unsubstituted alkoxy, aryloxy, amino or mercapto groups or mixtures thereof.

The alkoxy groups (substituted or unsubstituted) may be derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al., incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

Preferred substituent groups represented by X' for use in these copolymers are alkoxy groups, especially fluoroalkoxy groups and aryloxy groups, especially halogen-substituted phenoxy groups.

IV. The Tertiary Amine

The use of the tertiary amine in preparing the copolymers of the invention minimizes undesirable side reactions and at the same time acts as an effective acid scavenger.

Tertiary amines which may be employed in preparing the polymers of the invention are those represented by the general structure:

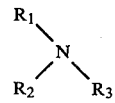

wherein R₁, R₂, and R₃ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4-diaza bicyclo (2,2,2) octane (DABCO), N-methyl pyrolle and N-methyl morpholine can also be utilized.

The preferred tertiary amines for use in preparing the polymers of the invention are triethylamine, N,N,N',N'-tetramethylethylene diamine (TMEDA) and pyridine.

As mentioned heretofore, the copolymers of the present invention are prepared by reacting the poly(dichlorophosphazene) polymer, the pyruvate ester and aliphatic alcohol, aromatic alcohol, amino compound or mercaptan compound in the presence of a tertiary amine.

The specific reaction conditions and proportion of ingredients employed in preparing these copolymers can vary somewhat depending on factors such as the reactivity of the specific reactants and the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e. in order to insure substantially complete conversion of the chlorine atoms in the polymer to the corresponding esters of the reactant compounds.

The above reaction is ordinarily carried out in the presence of a solvent. The solvent employed in the reaction should be a solvent for the poly(dichlorophosphazene) polymer, the pyruvate ester reactant, other reactants and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the pyruvate ester reactant and other reactants employed in the process should be at least molecularly equivalent to the number of available chlorine atoms in the polymer mixture. However, if desired, an excess of such reactants may be employed in order to insure substantially complete reaction of all the available chlorine atoms.

The following examples are submitted for the purpose of further illustrating the nature of the present invention and are not intended as a limitation on the scope thereof. Parts and percentages referred to in the examples are by weight unless otherwise indicated.

EXAMPLE I

Preparation of

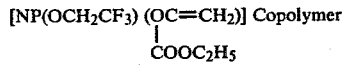

[NP(OCH$_2$CF$_3$) (OC=CH$_2$)] Copolymer
|
COOC$_2$H$_5$

To a 10 ounce beverage bottle was charged 100 cc of dry tetrahydrofuran (hereinafter THF), 12.3 cc (88 millimoles) of triethylamine, 3.2 cc of trifluoroethanol (44 millimoles) and 4.82 cc of ethyl pyruvate (44 millimoles). To this was added a 12.85 percent solids THF solution of poly(dichlorophosphazene) [36.0 grams, 40.0 millimoles of P] having a degree of polymerization of about 2600. The bottle was placed in a 80° C. rotary bath for 20 hours. After this no P—Cl bonds could be detected by I.R. (infrared spectroscopy) indicating good conversion. The triethylamine hydrochloride crystals were allowed to settle out and then a portion of this solution was poured onto a glass dish and the solvent was allowed to evaporate. After drying for 16 hours, a hard, clear film which was insoluble in THF was obtained.

EXAMPLE II

To a 10 ounce beverage bottle was charged 2.41 cc (22 millimoles) of ethyl pyruvate (CH$_3$COCOOC$_2$H$_5$), 100 cc of THF, 8.49 grams (66 millimoles) of p-chlorophenol, 12.3 cc (88 millimoles) of triethylamine and 42.7 grams (40.3 millimoles) of a 10.93% cyclohexane solution of poly(dichlorophosphazene) having a degree of polymerization of about 2600. Heating to 120° C. in an oven for 20 hours gave a solution that showed no PCl bond at 600 cm$^{-1}$ and new peaks at 545, 510 and 490 cm$^{-1}$.

Mixing 10 cc of this solution with 1 cc of a 0.06 M benzoyl peroxide solution in a test tube and then removing the solvent by a nitrogen purge gave a rubbery polymer. Upon heating to 120° C. for 45 minutes, a rubbery block of THF insoluble crosslinked polymer was produced.

The following Examples III and IV illustrate the use of copolymers of the invention as crosslinking agents.

EXAMPLE III

In this example, the copolymer of Example I was utilized as a crosslinking agent for styrene.

A 0.06 M solution (1.45 grams in 100 cc) of benzoyl peroxide in carbon tetrachloride was first prepared. Then, a solution consisting of 40 millimoles of the copolymer of Example I in 130 cc of THF was prepared. Following this, a mixture consisting of 1 cc of the benzoyl peroxide solution and 10 cc of the copolymer solution was charged to a 5.75"×0.085" diameter test tube. Then, 8.73 millimoles of styrene was added to the test tube. The solvent was then slowly removed from the resulting mixture under vacuum at room temperature. The tube was then heated in an oil bath at 112°-120° C. for 45 minutes (13.6 half lives of the peroxide) under a nitrogen atmosphere to affect curing.

The sample was then allowed to stand in THF for 3 days and the extend of solubility or swelling was observed. The sample was insoluble in THF and a few gelled particles were observed, indicating a high degree of crosslinking on a cure.

An analysis of a cured sample of the copolymer of Example I produced the following results: C, 32.71%; H, 4.32%, N, 6.81%; P, 12.53%; Cl, 0.36%. It was calculated that the product contained 2.56% triethylamine hydrochloride and 11.89% hydrolyzed product. From this the composition of the polymeric product would have calculated values of: C, 32.75%; H, 4.28%; N, 6.08%; P, 12.87%; Cl, 0.66%.

EXAMPLE IV

In this Example, Example III was substantially repeated except that the styrene was replaced with 8.72 millimoles of maleic anhydride.

The sample on standing in THF for 3 days appeared to be slightly soluble but many gel particles were observed indicating a moderate degree of crosslinking.

We claim:

1. A polyphosphazene copolymer containing randomly distributed units represented by the formulas:

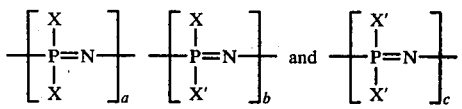

wherein X is

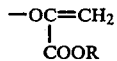

in which R is alkyl containing from 1 to 12 carbon atoms or aryl, wherein X' is selected from the group consisting of substituted or unsubstituted alkoxy, aryloxy, amino and mercapto groups and wherein $20 \leq (a+b+c) \leq 50,000$ per polymer.

2. The copolymer of claim 1 wherein X' is a fluoroalkoxy group.

3. The copolymer of claim 1 wherein X is

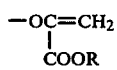

in which R is ethyl or methyl.

4. The copolymer of claim 1 wherein X' is trifluoroethoxy.

5. The copolymer of claim 1 wherein X is

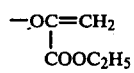

and X' is $-OCH_2 CF_3$.

6. A method of preparing polyphosphazene copolymers containing randomly distributed units represented by the formulas:

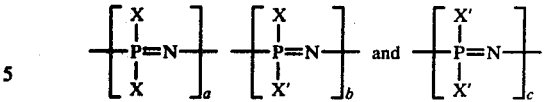

wherein X is

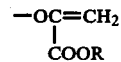

in which R is alkyl containing from 1 to 12 carbon atoms or aryl, wherein X' is selected from the group consisting of substituted or unsubstituted alkoxy, aryloxy, amino and mercapto groups and wherein $20 \leq (a+b+c) \leq 50,000$ per polymer; which method comprises reacting a polydichlorophosphazene polymer having the formula $-(NPCl_2)_n-$, wherein n is from 20 to 50,000 with a pyruvate ester having the formula $CH_3COCOOR$ in which R is alkyl containing from 1 to 12 carbon atoms or aryl and an aliphatic alcohol, aromatic alcohol, amino compound or mercaptan compound, or mixtures thereof, in the presence of a tertiary amine.

7. The method of claim 6 wherein said pyruvate ester is ethyl pyruvate.

8. The method of claim 6 wherein said pyruvate ester is methyl pyruvate.

9. The method of claim 6 wherein said pyruvate ester is ethyl pyruvate and said aliphatic alcohol is trifluoroethanol.

10. The method of claim 6 wherein said pyruvate ester is methyl pyruvate and said aliphatic alcohol is trifluoroethanol.

11. The method of claim 6 wherein said tertiary amine is triethyl amine.

12. The method of claim 6 wherein said pyruvate ester is ethyl pyruvate, said alcohol is trifluoroethanol and said tertiary amine is triethylamine.

* * * * *